(12) United States Patent
Slater et al.

(10) Patent No.: US 6,665,748 B1
(45) Date of Patent: Dec. 16, 2003

(54) SPECIALIZED PCMCIA HOST ADAPTER FOR USE WITH LOW COST MICROPROCESSORS

(75) Inventors: John T. Slater, Mountain View, CA (US); Scott Wilkinson, San Francisco, CA (US); James Slater, Mountain View, CA (US)

(73) Assignee: 3Com Corporation, Santa Clara, CA (US)

( * ) Notice: Subject to any disclaimer, the term of this patent is extended or adjusted under 35 U.S.C. 154(b) by 432 days.

(21) Appl. No.: 09/752,495

(22) Filed: Dec. 28, 2000

Related U.S. Application Data (60) Provisional application No. 60/230,328, filed on Sep. 6, 2000.

(51) Int. Cl.[7] .......................... G06F 13/14; G06F 13/28
(52) U.S. Cl. .......................... 710/23; 710/25; 710/107; 710/110; 710/305; 710/308; 710/311; 710/313
(58) Field of Search .............................. 710/22, 23, 25, 710/107, 110, 305, 308, 311, 313

(56) References Cited

U.S. PATENT DOCUMENTS

| | | | |
|---|---|---|---|
| 5,515,373 A | * | 5/1996 | Lynch et al. ................. 370/465 |
| 5,822,618 A | * | 10/1998 | Ecclesine ...................... 710/57 |
| 6,014,717 A | * | 1/2000 | Bezzant et al. ............... 710/22 |
| 6,374,315 B1 | * | 4/2002 | Okada et al. ................. 710/62 |

* cited by examiner

Primary Examiner—Rehana Perveen
(74) Attorney, Agent, or Firm—Wagner, Murabito, & Hao LLP (57) ABSTRACT

Apparatus and method for providing DMA transfers between an adapter card with or with out DMA capabilities and a system CPU with DMA capabilities. An adapter DMA controller circuit resides between the system CPU and the adapter card. This adapter DMA controller allows the system to run in immediate mode which allows the system CPU to talk to the adapter card as if the adapter DMA controller was not there. The system can also run in DMA mode. In this mode the system CPU sets up the system DMA controller and the adapter DMA controller. The adapter DMA controller takes over sending or receiving data to the adapter card and then requesting a DMA transfer with the system DMA controller. The transfer of data between the adapter DMA controller and the adapter does not use any system CPU resources such as the data and address busses. The system CPU is free to use the system resources to continue operation.

27 Claims, 8 Drawing Sheets

SPECIALIZED PCMCIA HOST ADAPTER FOR USE WITH LOW COST MICROPROCESSORS

This application claims the benifits of Provisional Application No. 60/230,328 filed Sep. 6, 2000.

FIELD OF THE INVENTION

The present invention can be used to add PCMCIA and ISA bus support to a low cost microprocessor (uP). More particularly, this invention provides a method of supporting PCMCIA devices with slow access times without sacrificing a large percentage of the microprocessoris data and address bus utilization. This can be accomplished by using the present invention in combination with one of the many low cost microprocessors that include a Direct Memory Access (DMA) Controller.

BACKGROUND OF THE INVENTION

The Personal Computer Memory Card International Association (PCMCIA) sets standards by which a CPU or host adapter interfaces with a peripheral over a specified interface. This PCMCIA interface is a full featured and versatile method of accessing a wide variety of peripheral devices. The interface provides for optional feature support, such as DMA, by the peripheral devices (PC Cards). Another important characteristic of the PCMCIA interface is that it is designed to interface to devices with great disparity in access speeds. When the CPU or host adapter initiates a transfer to or from the PCMCIA device, the PC Card can extend the access cycle to meet the needs of any slow hardware in the card. This allows PC Cards with different access times to all share the same bus interface. This introduces an important problem however, that when directly connected to a microprocessor's bus, slow PCMCIA devices can occupy a significant amount of the total available bus access time. The present invention will address this "bus utilization" problem.

The PCMCIA interface is unique in that in contains several control signals that are not found on PCI, ISA or other common PC CPU busses. To interface a CPU to a PCMICA card one of two options is typically followed. The first alternative is to use an external PCMCIA controller that is designed to interface to one of the common PC CPU bus architectures. There are several of these PCMCIA host adapter chips available, however they are not appropriate for low cost electronic designs because the host adapter adds significant cost, and like the PCMCIA card itself, it is not designed to interface to the simple bus control signals of low cost microprocessors.

The second commonly used method for accessing PCMCIA cards to is to use a highly integrated uP with a PCMCIA controller built in. This can be an attractive solution for small consumer electronic devices because these microprocessors are typically highly integrated devices with a wide range of peripherals (such as PCMCIA controllers, Ethernet controllers, Serial and Parallel ports) built into to the chip. This high degree of flexibility comes at a high price however, as the cost of these microprocessors are significantly higher then their equally powerful, but less versatile counterparts. Most of these highly integrated microprocessors, such as the Motorola PowerPC, suffer from the bus utilization problem discussed earlier. The PCMCIA card is attached to the same address and data bus as system memory and storage, so a slow PCMCIA device drastically reduces the time available to access the other system devices. The uP provides the specialized PCMCIA control signals, but does leaves the PCMCIA device connected to the system bus along with memory and other peripherals. There is at least one highly integrated uP, the AMD Elan, which does not suffer from the bus utilization problem. This full featured, and costly, alternative has a separate data and address bus for the PCMCIA cards is controls, and thereby removes the slow PCMCIA devices from the main system buses. This is an expensive solution to the bus utilization problem, especially for simple applications that do not take advantage of the wide variety of peripherals that drive up the cost of the processor.

The low cost microprocessors are a stark contrast to the highly integrated system on a chip devices just discussed. These can be fast and power processors, however they have limited built in peripherals. These processors have very basic bus and control signals which are sufficient to interface to simple memory peripherals like RAM and FLASH, however they are not able to interface directly to more sophisticated peripherals like Ethernet or PCMCIA host adapter chips. These peripheral adapters are designed to interface directly to a common PC bus (such as ISA or PCI) and not the simple bus of the low cost uP.

One capability which is common to many low cost microprocessors however, is their integration of a DMA Controller. A DMA Controller is typically used to copy data between a peripheral device and system memory. A DMA transfer is special because an external device can initiate each individual word transfer. In this manner the peripheral initiates the transfer by indicating to the uP that it is ready for a single read or write a access. One motivation for performing this kind of transfer is that the uP can continue to execute instructions and even make bus accesses while the bus is not being used to transfer data between to two devices in the DMA. Although this is an efficient way to transfer data between a peripheral and memory, it does not solve the bus utilization problem of slow PC Card devices. Because the device is still connected directly to the uP bus, the amount of time the bus is used by the PC Card remains the same.

What is needed is a low cost method to enhance a simple uP to include a PCMCIA interface without burdening the system bus with accesses to slow PC Card devices.

SUMMARY OF THE INVENTION

The present invention solves the above problems by the use of additional logic typically collected in either a Field Programmable Gate Array (FPGA) or Application Specific Integrated Circuit (ASIC). The device functions as a Specialized PCMCIA Host Adapter (SPHA). The most fundamental operation of this logic is to interface between the simple bus of a low cost uP and the unique interface of PCMCIA devices. The PCMCIA control signals, as well as the data and address bus lines are completely isolated from the uP and only connected to the SPHA. The SPHA in turn is connected to the address, data and control lines of the uP.

The SPHA provides two methods modes to access the PC Card. The first method describes "Immediate Mode" accesses. In this mode the SPHA passes the PC Card address and data lines directly to those of the uP. This mode does not address the bus utilization problem since the PC Card signals have been connected directly to the uP. The SPHA still plays an important role in this mode however, as it is responsible for generating the PCMCIA control signals which are not native to the basic uP bus. When appropriate, the SPHA also provides the necessary Data Transmission Acknowledge (DTACK) signal to the uP to indicate that the access to the PC Card has completed. Immediate Mode access are appropriate for single or non-consecutive accesses to the PC Card.

The SPHA provides a second, more advanced, method of accessing the PC Card referred to as "DMA Mode." This mode provides-highly efficient block (consecutive) transfers to or from the PC Card. This mode provides a solution to the bus utilization problem. The program code running on the uP sets up a DMA Mode transfer by configuring both the SPHA and the DMA controller on the uP. The SPHA then interacts with the uP DMA controller to accomplish a transfer between system memory and the PC Card.

When transferring a block of data from memory to the PC Card the SPHA will use a DMA control line to indicate that it is ready to read a word of memory from system RAM. Both system RAM and the SPHA have very low access times so the transfer between these two devices happens very quickly, with minimal utilization of the system bus. After the word is copied from system RAM, the SPHA then writes this word into the appropriate location in the PC Card. This transfer to the PC Card is done using signals that are completely isolated from the uP, so there is no impact of slow PC Card access times on the uP bus. Once the word has been written into the PC Card the process begins again until the entire block transfer is complete. Both the uP DMA Controller and the SPHA have been programmed with the DMA transfer information, so both devices remain synchronized throughout the transfer.

Transferring a block of data from the PC Card to system memory happens in a very similar fashion. Again the transfer is configured and initiated by the program code running on the uP. This time the SPHA begins by reading a word of data from the PC Card. This potentially very slow access is completely isolated from the uP bus. Once the data has been read from the card, the SPHA asserts a uP DMA signal to indicate it is ready to transfer a word into the system RAM. When the uP approves this transfer the data is very quickly transferred between the fast SPHA and RAM devices. As in the reverse process described above, this process repeats until the entire block as been transferred.

In combination with isolating the uP from the PCMCIA interface, the present invention solves the bus utilization problem for block transfers by acting as a data buffer between the uP and PC Card. The SPHA is itself a high-speed addressable peripheral connected directly to the uP bus. The SPHA improves the bus utilization efficiency of block transfers by buffering data to or from the PC card. This allows very fast transfer of PC Card data between system memory and the SPHA. The SPHA then works in the background to transfer data to the PC Card using dedicated bus and control signals. The SPHA can buffer multiple words of PC Card data to make transfers between system RAM more efficient. For example on 32 bit transfer can be made between system RAM and the SPHA for every two 16 bit accesses to the PC Card. This process can be easily extended to make four very fast 32 bit RAM accesses (a "line" access) and then the corresponding eight accesses to the PC Card. The SPHA buffers data in the same way when transferring data from the PC Card to RAM. In this direction two 16 bit PC Card reads are done for one 32 bit RAM write and so on. The very fast transfers between system RAM and the SPHA have mitigated the bus utilization problem of slow PC Card devices.

DETAILED DESCRIPTION OF THE INVENTION

It should be pointed out at this point that the patent covers any device that does or does not have DMA capability that can be hooked to a system bus. The PCMCIA device is used through out the patent for consistency. The device could just as well be an ISA device.

Figure 1:
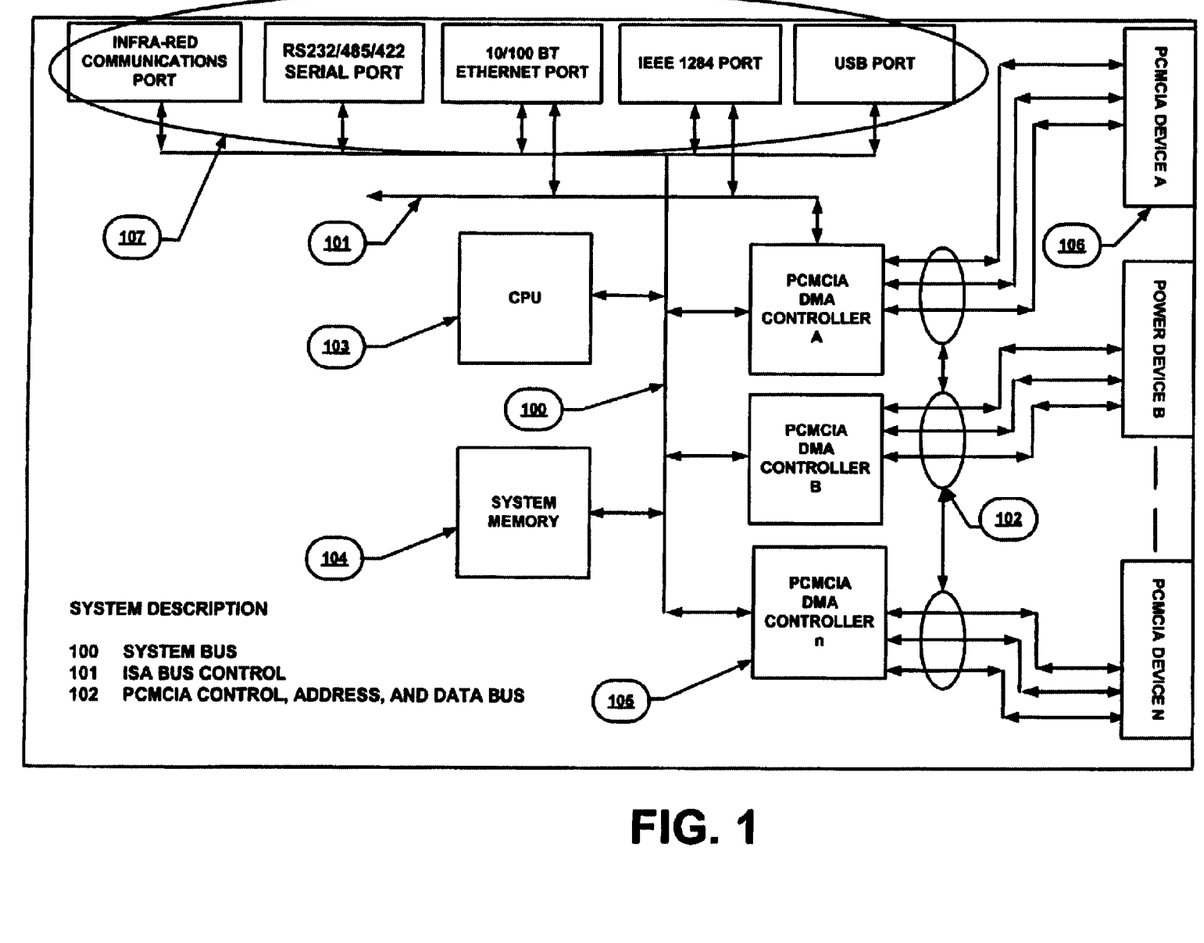
FIG. 1 is a system overview of a device using present invention.

A block diagram of a computer system according to the preferred embodiment of the present invention is shown in FIG. 1. This system includes the system CPU 103 and system memory 104, the PCMCIA DMA controllers 105, the I/O devices both ISA and non ISA 107, the system bus 100, the ISA bus 101, and the PCMCIA address, data, and signal busses 102. There can be n number of PCMCIA DMA controllers 105 connected to the system bus 100. The system shown can operate in three different modes. One mode is the immediate mode where the PCMCIA DMA controller 105 generates the control signals for the PCMCIA device 106 and passes through the system data and address busses 102. The second mode is the ISA mode where the PCMCIA DMA controller 105 will generate the ISA control signals 101 to control n*X ISA devices where X is a changeable parameter. The other mode is the DMA mode. In this mode the PCMCIA DMA controller 105 acts as the PCMCIA controller. It generates all the timing and signals 102 to autonomously read or write to the PCMCIA device 106. The ISA mode and DMA mode can occur simultaneously. The PCMCIA immediate and DMA modes are determined by register settings in the PCMCIA DMA controllers 105. Set up of these registers should be part of the system CPU 103 initialization code.

CONTROL REGISTER DESCRIPTION

Figure 2:
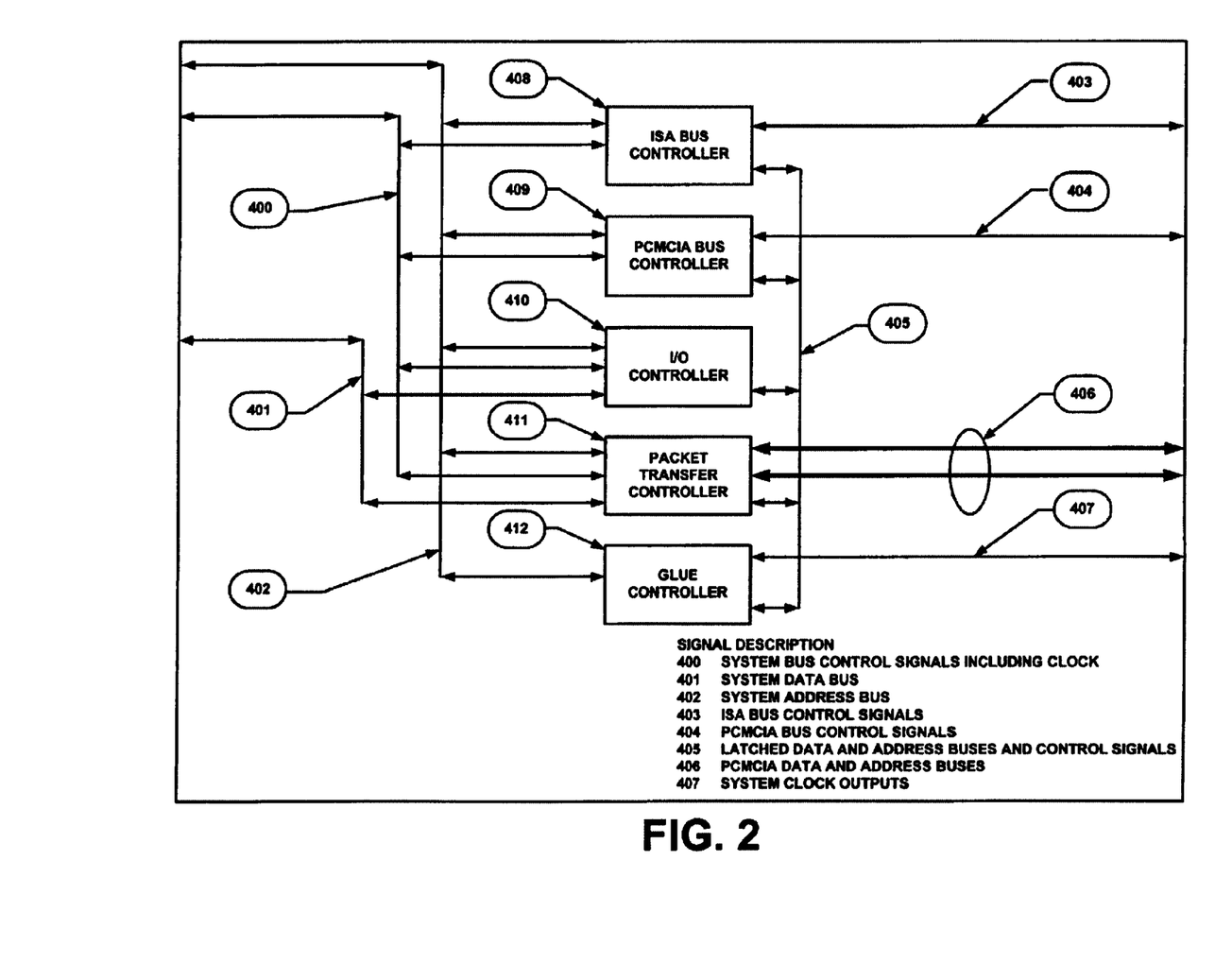
FIG. 2 is a block diagram of the present invention.
Figure 5:
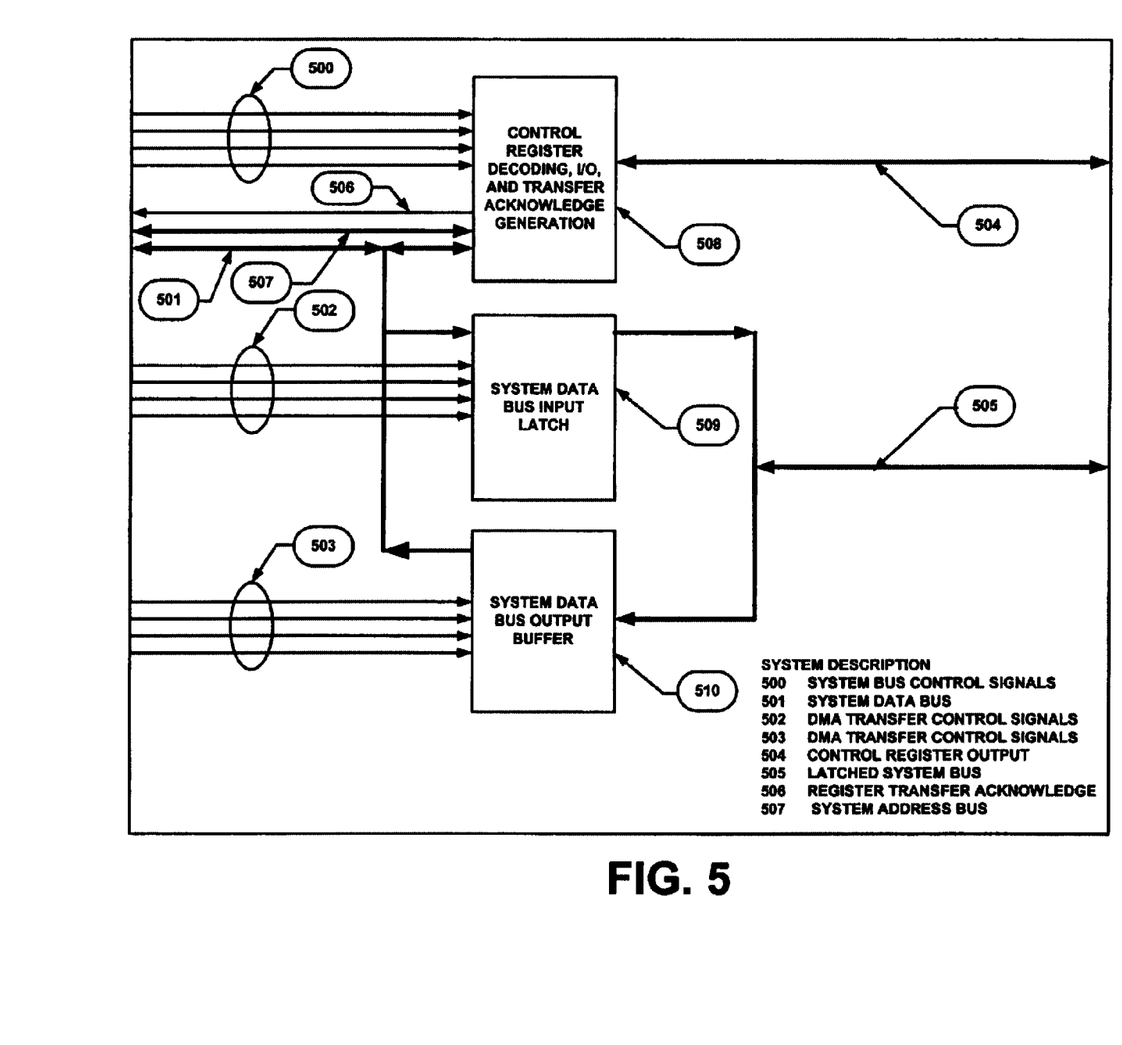
FIG. 5 is a block diagram of the I/O controller of the present invention.
Figure 6:
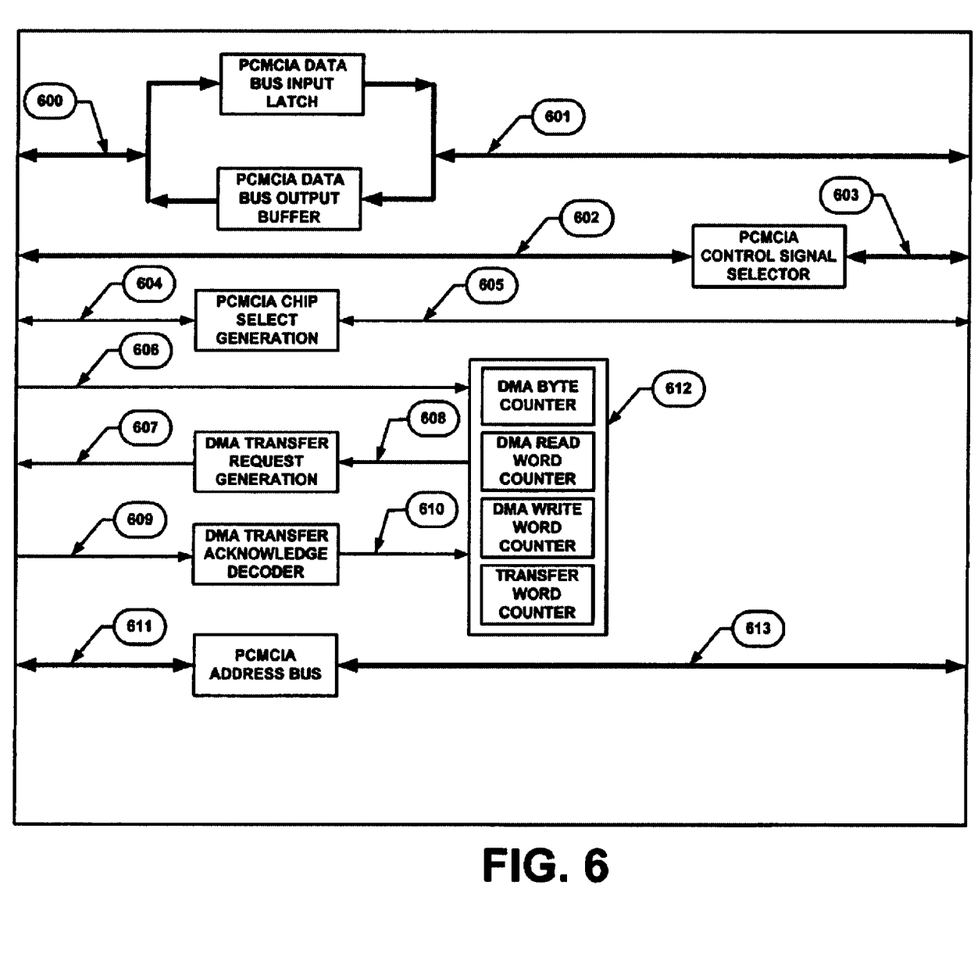
FIG. 6 is a block diagram of the packet transfer controller of the present invention.

A detailed look at the PCMCIA DMA controller 105 is shown in FIG. 2. It consists of an ISA bus controller 408 section 408, a PCMCIA bus controller section 409, an I/O controller section 410, a packet transfer controller section 411, and a glue logic section 412. The control registers are in the I/O controller section 410 which is shown in FIG. 5. There are 5 8 bit control registers. These registers control settings can be read back out of the PCMCIA DMA controller 105 for verification of settings. Control register A is an 8 bit input register and is used to program the PCMCIA device 106 setup, device hold, and transfer acknowledge timing. This flexibility allows many different PCMCIA devices 106 with different timing requirements to be controlled by the PCMCIA DMA controller 105. Control register B is used for general purpose system control. Bit 1 is an input that disables the configure button input to the system CPU 103. Bits 2–4 are inputs that control LEDs. Bit 5 is and input that resets the PCMCIA card. Bit 6 is an output that gives the status of the configure button. Bits 7 and 8 are outputs that give the status of the RI and CD signals from the serial port. Control register C is an 8 bit input register used to set up, control and start the PCMCIA DMA transfer. Bit 1 sets the PCMCIA mode as immediate or DMA. Bit 2 sets if the PCMCIA device address bus 613 is incremented during a DMA transfer. Bit 3 indicates that the next write to the PCMCIA device 106 will be a loading of DMA transfer data. Bit 4 is used to start the DMA transfer. Bit 5 sets the DMA transfer as a read from or a write to the PCMCIA device 106. Bits 6–8 are used to set up PCMCIA device control signals 302 to a known state during a PCMCIA device 106 DMA transfer. Control register D is an 8 bit I/O port. Bits 1 and 2 are inputs used to set up PCMCIA device control signals 302 to a known state during a PCMCIA device 106 DMA transfer. Bit 3 is an output that signals the system CPU 103 that the DMA transfer is complete. Bit 4 is an input that is used to clear the latched parallel port interrupt. Bits 5–8 are unused. Control register E is a general purpose I/O port that is brought out to a header. Bits 1–4 are inputs and bits 5–8 are outputs.

MODE DESCRIPTION

Figure 3:
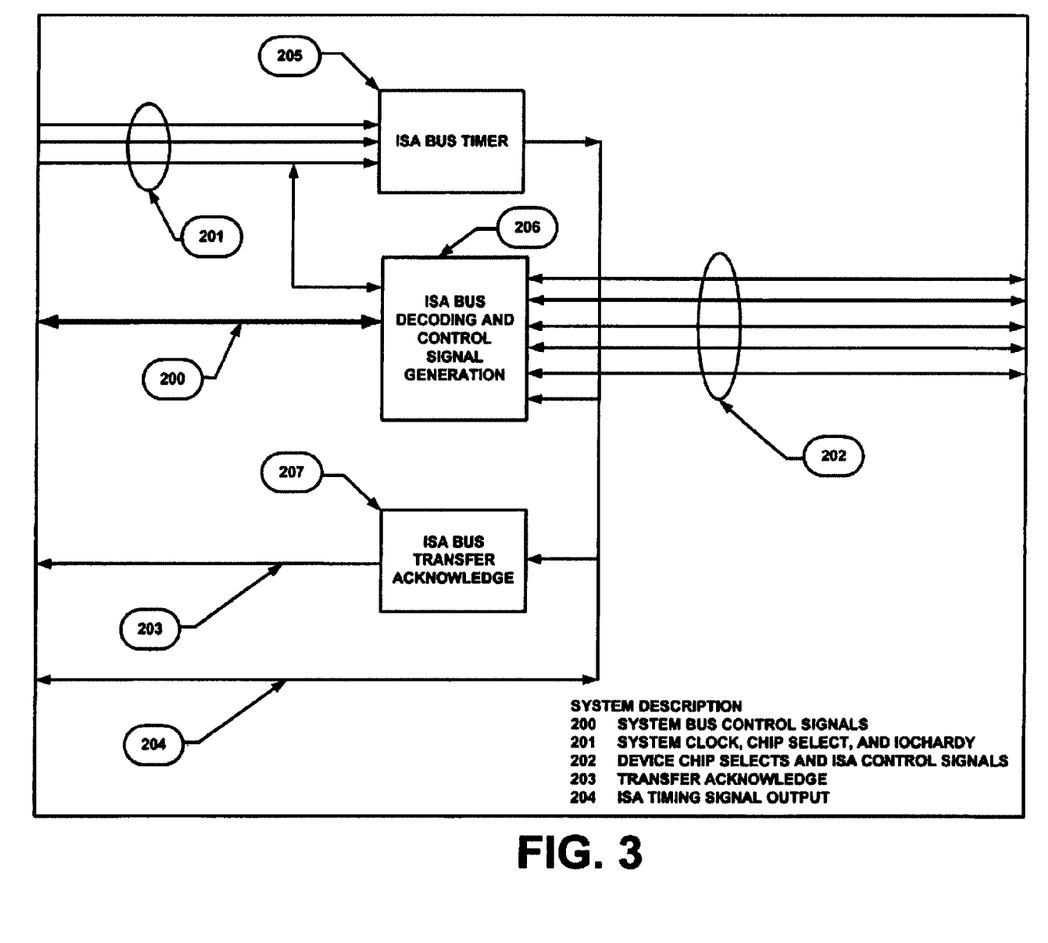
FIG. 3 is a block diagram of the ISA bus controller of the present invention.

In the ISA mode the PCMCIA DMA controller 105 will generate the signals to control the ISA device. The ISA bus controller 408 is shown in FIG. 3. For a read from an ISA device the system CPU 103 will first put the address on the system bus 100 and then assert the appropriate chip select on the system bus 100. The ISA bus controller 408 will recognize the chip select 201 and the ISA bus timer will start. The ISA bus decoding and control signal generation module will then decode the system address bus 200 and bus control signals 201. After meeting set up times as determined by the ISA bus timer the appropriate ISA control signals 202 will then be asserted. If the ISA control signal IOCHRDY 201 is asserted by the ISA device the timer will pause as long as this line is asserted. When IOCHRDY 201 is de-asserted time continues and the cycle continues. After meeting device timing requirements as determined by the ISA bus timer the ISA control signals 202 will be de-asserted. After meeting device hold times as determined by the ISA bus timer a transfer acknowledge signal 203 is generated to the CPU. The system CPU 103 then de-asserts the bus control signals 201. The ISA bus controller 408 is then reset. This ends the read cycle for an ISA device. For a write to an ISA device the system CPU 103 will first put the address on the system bus 100 and then assert the appropriate chip select on the system bus 100. The ISA bus controller 408 will recognize the chip select 201 and the ISA bus timer will start. The ISA bus decoding and control signal generation module will then decode the system address bus 200 and bus control signals 201. After meeting set up times as determined by the ISA bus timer appropriate ISA control signals 202 will then be asserted. If the ISA control signal IOCHRDY 201 is asserted by the ISA device the timer will pause as long as this line is asserted. When IOCHRDY 201 is de-asserted time continues and the cycle continues. After meeting device timing requirements as determined by the ISA bus timer the ISA control signals 202 will be de-asserted. After meeting device hold times as determined by the ISA bus timer a transfer acknowledge signal 203 is generated to the system CPU 103. The system CPU 103 then de-asserts the bus control signals 201. The ISA bus controller 408 is then reset. This ends the write cycle for an ISA device.

Figure 4:
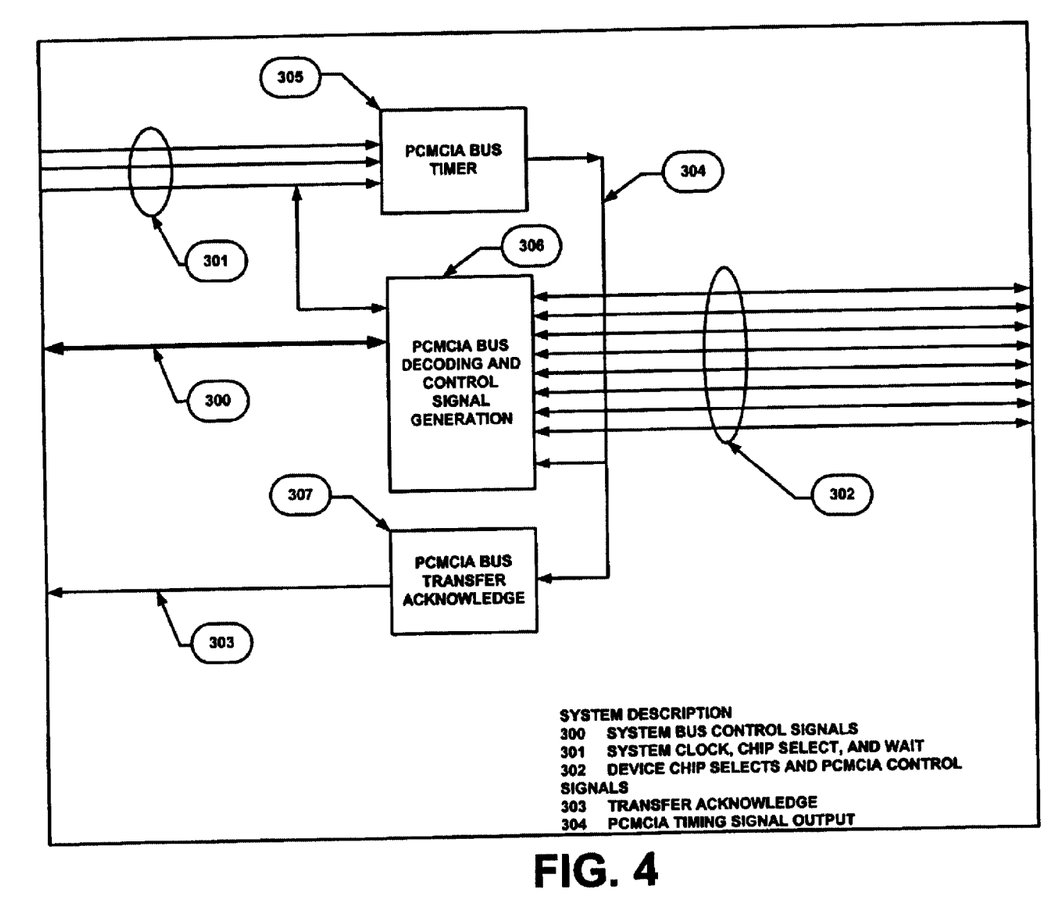
FIG. 4 is a block diagram of the PCMCIA bus controller of the present invention.

In immediate mode the PCMCIA bus controller 409 generates the signals to control the PCMCIA device 106. The PCMCIA bus controller 409 is shown in FIG. 4. For a read from a PCMCIA device 106 in immediate mode the control registers need to be set up accordingly. With the registers set up for immediate mode the cycle is started with the system CPU 103 putting the address on the system address bus 100 and then asserting the appropriate chip select on the system bus 100. During immediate mode the Packet transfer controller 411 will pass through all system bus control signals. The PCMCIA bus controller 409 will recognize the chip select 301 and the PCMCIA bus timer will start. The PCMCIA bus decoding and control signal generation module will then decode the system address bus 300 and bus controls signals 301. After the programmed set-up time, as determined by control register A, is met the appropriate PCMCIA control signals 302 will be asserted. If the wait signal from the PCMCIA device 106 is asserted then the PCMCIA bus timer will pause. When the wait signal is de-asserted then the PCMCIA bus decoding and control signal generation module will de-assert the appropriate PCMCIA control signals 302 and generate a transfer acknowledge signal 303 to the system CPU 103 after the programmed hold time as determined by control register A. If the wait signal is never generated by the PCMCIA device 106 then the PCMCIA control signals 302 will be held for the programmed time as determined by control register A. Then the PCMCIA bus decoding and control signal generation module will de-assert the appropriate PCMCIA control signals 302 and generate a transfer acknowledge signal 303 to the system CPU 103 after the programmed hold time as determined by control register A. The system CPU 103 then de-asserts the bus control signals and 301. The PCMCIA bus controller 409 is then reset. This ends the read cycle in immediate mode for a PCMCIA device 106. For a write to a PCMCIA device 106 in immediate mode the control registers need to be set up accordingly. With the registers set up for immediate mode the cycle is started with the system CPU 103 putting the address on the system address bus 100 and then asserting the appropriate chip select on the system bus 100. During immediate mode the Packet transfer controller 411 will pass through all system bus control signals. The PCMCIA bus controller 409 will recognize the chip select 301 and the PCMCIA bus timer will start. The PCMCIA bus decoding and control signal generation module will then decode the system address bus 300 and bus controls signals 301. After the programmed set-up time, as determined by control register A, is met the appropriate PCMCIA control signals 302 will be asserted. If the wait signal from the PCMCIA device 106 is asserted then the PCMCIA bus timer will pause. When the wait signal is de-asserted then the PCMCIA bus decoding and control signal generation module will de-assert the appropriate PCMCIA control signals 302 and generate a transfer acknowledge signal 303 to the system CPU 103 after the programmed hold time as determined by control register A. If the wait signal is never generated by the PCMCIA device 106 then the PCMCIA control signals 302 will be held for the programmed time as determined by control register A. Then the PCMCIA bus decoding and control signal generation module will de-assert the appropriate PCMCIA control signals 302 and generate a transfer acknowledge signal 303 to the system CPU 103 after the programmed hold time as determined by control register A. The system CPU 103 then de-asserts the bus control signals and 301. The PCMCIA bus controller 409 is then reset. This ends the write cycle in immediate mode for a PCMCIA device 106.

The start of a DMA cycle starts when the PCMCIA device 106 interrupts the system CPU 103. While in immediate mode the system CPU 103 will query the PCMCIA device 106 on its state. If it is determined that, the DMA mode is needed the system CPU 103 will set up the DMA transfer in the CPU's DMA controller as either a DMA read or write and then set up the control registers as explained earlier to accommodate a DMA transfer. With the control registers set up with bit 3 of control register C the next write to the PCMCIA device 106 will load the DMA transfer data which consists of the start address of the PCMCIA for the DMA transfer and the number of words to transfer. This is accomplished by blocking the control signals to the PCMCIA device 106 while having the system CPU 103 write to the PCMCIA device 106 at the start DMA address with the data of how many words are to be transferred. The PCMCIA DMA controller 105 will load the address counter with the address on the system address bus 100 and load the DMA word counter with the data on the system data bus 100. This special write to the PCMCIA device 106 is captured by the PCMCIA DMA controller 105 and is not seen by the PCMCIA device 106. The transfer acknowledge signal is generated by the Packet transfer controller 411 using the output from the ISA timer module. When the DMA transfer data is transferred to the PCMCIA DMA controller 105 the system CPU 103 sets the DMA start bit in the control registers. This will start the DMA transfer from the PCMCIA device 106 It should be noted here that while in DMA mode the system bus control signals are blocked from the PCMCIA bus control module and synthesized using the data set up in the corresponding control register.

It should also be noted the system address and data busses are blocked from the PCMCIA bus controller module 409 and synthesized by the PCMCIA DMA controller 105 module. By doing this the system CPU 103 is free to use the system busses. If the DMA transfer is a read from the PCMCIA device 106 a chip select is generated by the packet transfer control module for the PCMCIA bus controller module 409. The PCMCIA bus controller module 409 will then interpret the synthesized system busses and perform the read as described above. The data from the PCMCIA device 106 is latched by the packet transfer controller module 411. The transfer acknowledge is generated by the PCMCIA bus controller module 409. This signals to the packet transfer controller 411 to de-assert the chip select to the PCMCIA bus controller 409. This in turn will reset the PCMCIA bus controller 409. The PCMCIA address bus is then increment twice to address the next word if the corresponding bit is set in the control register. If it is not the address remains unchanged. The DMA word counter will decrement by one. The DMA word read counter will increment by one. If only one word has been read from the PCMCIA device 106 the packet transfer controller 411 will generate another chip select for the PCMCIA bus controller 409. The process will then repeat until the next word is read from the PCMCIA device 106. Once the second word is latched by the packet transfer module a DMA request is sent to the system CPU 103. The PCMCIA DMA controller 105 then monitors the system bus signals to determine if the DMA request has been acknowledged. Once the DMA request has been acknowledged the PCMCIA DMA controller 105 will wait predetermined number of system clock cycles and then drive the system data bus with the data to be transferred into the DMA target.

The DMA word read counter is reset. The system CPU 103 will then de-assert the system bus control signals to end the DMA transfer. The PCMCIA DMA controller 105 will stop driving the bus and generate the next chip select to the PCMCIA bus controller 409. This cycle will continue until the word counter decrements to zero at which time the done signal is asserted. New chip selects will be blocked from going to the PCMCIA bus controller 409. The last DMA transfer takes place. The system CPU DMA controller should interrupt the system CPU 103 that the DMA transfer is complete. The system CPU 103 will then check the state of the done bit. If asserted the system CPU 103 will take the PCMCIA DMA controller 105 out of DMA mode and put it back into immediate mode.

If the DMA transfer is a write to the PCMCIA device 106 a DMA request is generated to receive the first long word from the DMA target. The PCMCIA DMA controller 105 then monitors the system bus signals to determine if the DMA request has been acknowledged. Once the DMA request has been acknowledged the PCMCIA DMA controller 105 will latch the data from the system data bus into the packet transfer controller module 411. The packet transfer controller module 411 will then send a chip select to the PCMCIA bus controller 409. The PCMCIA bus controller module 409 will then interpret the synthesized system busses and perform the write as described above. The data transferred will be the first word of the long word. The transfer acknowledge is generated by the PCMCIA bus controller module 409. This signals to the packet transfer controller 411 to de-assert the chip select to the PCMCIA bus controller 409 and stop driving the PCMCIA data bus. This in turn will reset the PCMCIA bus controller 409. The PCMCIA address bus is then increment twice to address the next word if the corresponding bit is set in the control register. If it is not the address remains unchanged. The DMA word counter will decrement by one. The DMA word write counter will increment by one. If only one word has been written to the PCMCIA device 106 the packet transfer controller 411 will generate another chip select for the PCMCIA bus controller 409.

The process will then repeat until the next word is written to the PCMCIA device 106. Once the second word is written to the PCMCIA device 106 a DMA request is sent to the system CPU 103. The PCMCIA DMA controller 105 then monitors the system bus signals to determine if the DMA request has been acknowledged. Once the DMA request has been acknowledged the PCMCIA DMA controller 105 will latch the next long word of data from the system data bus into the packet transfer controller module 411. This data will then be transferred to the PCMCIA device 106 as described above. This cycle will continue until the word counter decrements to zero at which time the done signal is asserted. At this point the system CPU 103 DMA controller has interrupted the system CPU 103 and the system CPU 103 is monitoring the done line. When the system CPU 103 detects the done signal as asserted it takes the PCMCIA DMA controller 105 out of DMA mode and puts it into immediate mode. Non DMA accesses can now be made to the PCMCIA device 106.

Figure 7:
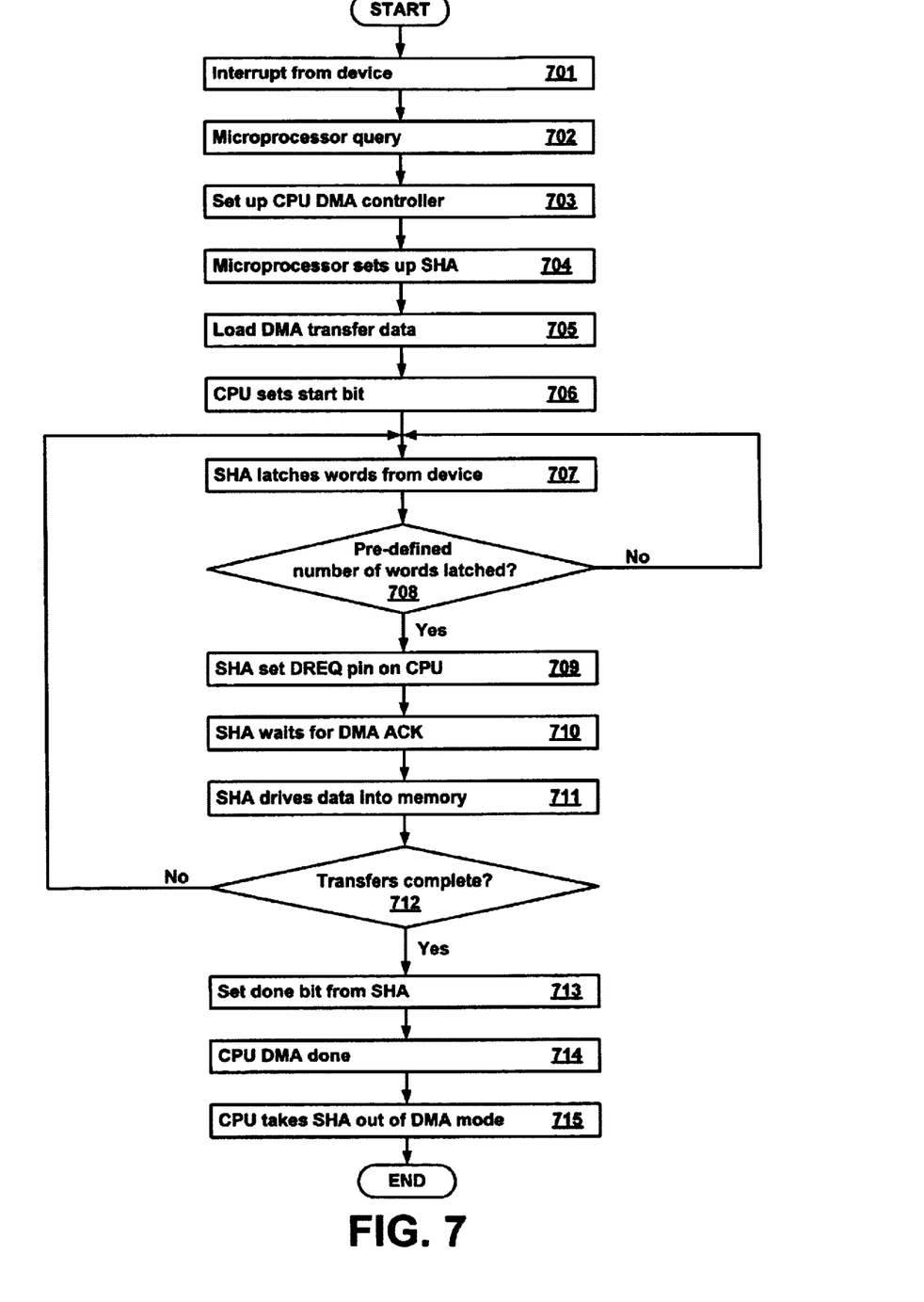
FIG. 7 is a flowchart describing the steps for a read operation between a microprocessor having DMA capabilities and a non-DMA device via a specialized host adapter (SHA).

FIG. 7 is a flowchart describing the steps for a read operation between a microprocessor having DMA capabilities and a non-DMA device via a specialized host adapter (SHA). The first step 701 entails the device generating an interrupt signal. In response to this interrupt, the microprocessor queries the device to determine whether a DMA transfer is needed, step 702. If a DMA transfer is needed, the CPU's DMA controller is set up, step 703. This may include setting up a cycle steal mode and an external DMA request. If needed, the SHA is set up by the microprocessor, step 704. Setting up the SHA may include instructions as to whether to increment the address of the device, the direction (e.g., read or write), set the SHA in DMA mode. Thereupon, the SHA is loaded with the transfer data, step 705. The SHA is given the number of bytes as well as the starting address. The CPU then sets the start bit in the SHA, step 706. The SHA begins latching words from the device, step 707. The SHA latches a first word, a second word, a third, word, etc. until the pre-defined number of words from the device have been latched, step 708.

When the pre-defined number of words have been latched, the SHA sets the DREQ pin on the CPU with a DMA request, step 709. The SHA waits for the DMA ACK (acknowledge) or decodes a DMA acknowledge, step 710. Upon receiving the DMA ACK signal, the SHA drives the data on the bus into the memory as a DMA, step 711. It should be noted that the CPU controls the memory, and the SHA drives the data bus only. Steps 707–711 are repeated until the data transfer is complete, step 712. When the data transfer is finished, the done bit is set by the SHA, step 713. The CPU DMA done interrupt is generated internal to the CPU, step 714. Finally, the CPU takes the SHA out of DMA mode, step 715.

Figure 8:
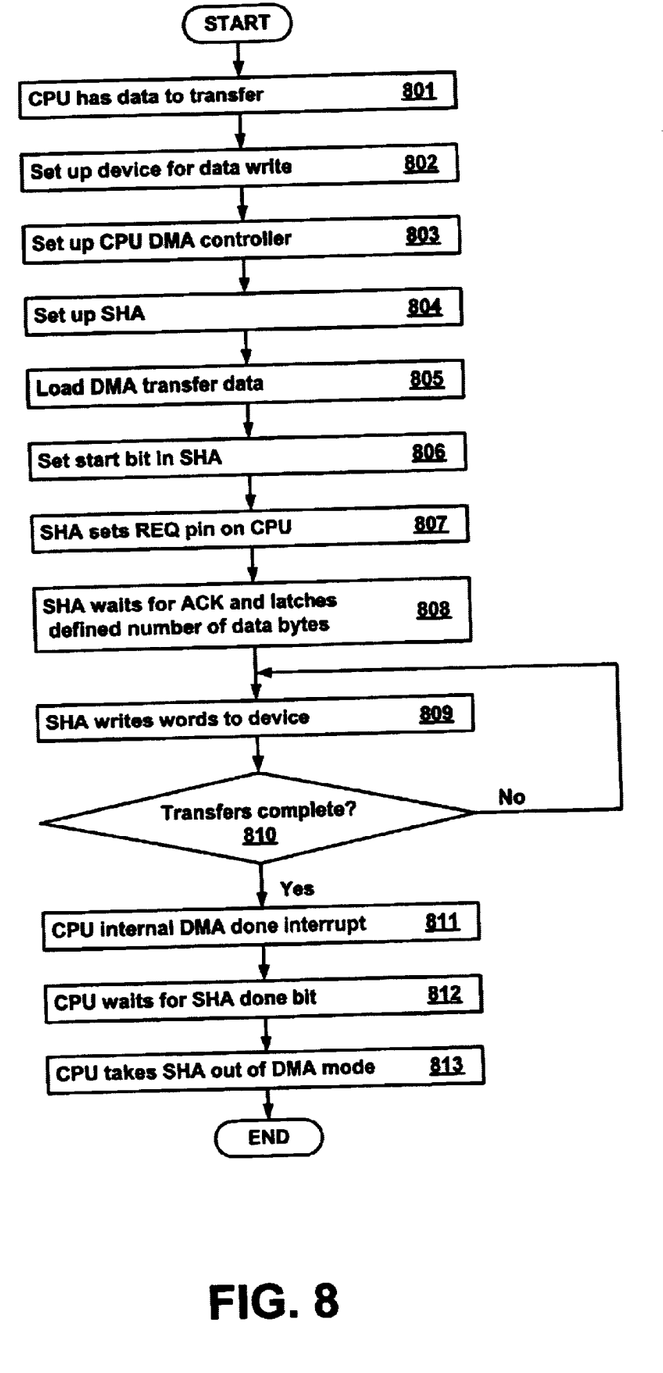
FIG. 8 is a flowchart describing the steps for performing a write operation between a microprocessor having DMA capabilities and a non-DMA device via the SHA.

FIG. 8 is a flowchart describing the steps for performing a write operation between a microprocessor having DMA capabilities and a non-DMA device via the SHA. Given that the CPU has data to transfer to the non-DMA enabled device, step 801, the device is optionally set up for a data write, step 802. Next, the CPU's DMA controller is set up, step 803. This may include setting up a cycle steal mode and generating an external DMA request. If needed, the SHA is set up by the microprocessor, step 804. Setting up the SHA may include instructions as to whether to increment the address of the device, the direction (e.g., read or write), set the SHA in DMA mode. Thereupon, the SHA is loaded with the transfer data, step 805. The CPU then sets the start bit in the SHA, step 806. In step 807, the SHA sets the REQ pin on the CPU. The SHA waits for an ACK signal or decodes an ACK signal and latches in the defined number of data bytes, step 808. The SHA writes the latched words of data to the device, step 809. This part of the write operation is done as conventional non-DMA signaling as set forth according to the device bus standards (e.g., PCMCIA). This process continues according to step 810 until the data transfers are complete. Once all the data has been written, the CPU's internal DMA done interrupt is generated, step 811. The CPU waits for the SHA done bit to be set, step 812. Lastly, the CPU takes the SHA out of DMA mode, step 813.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for performing read and write DMA operations between a microprocessor having direct memory access capability and a device which does not have direct memory access capability, comprising:
   a first interface to a bus coupled to the microprocessor, wherein a direct memory access read from the bus and a direct memory access write to the bus are performed;
   a second interface to the device, wherein data is read from the device and data is written to the device in a non direct memory access manner;
   a memory coupled to the first interface and the second interface for temporarily storing data, wherein the bus can be used by the microprocessor while the memory is in the process of having data being stored thereon.

2. The apparatus of claim 1, wherein the bus is a PCMCIA bus.

3. The apparatus of claim 2, wherein the device is a PCMCIA device.

4. The apparatus of claim 1 further comprising circuitry for synthesizing PCMCIA signals.

5. The apparatus of claim 1 further comprising circuitry for synthesizing ISA signals.

6. A system comprising:
   a system bus;
   a main memory for storing data coupled to the system bus;
   a central processing unit coupled to the system bus, wherein the central processing unit includes a DMA controller which controls DMA read/write operations to/from the main memory;
   a host adapter logically coupled between the system bus and a set of PCMCIA lines, wherein the host adapter performs a DMA read from the main memory, a DMA write to the main memory, a non-DMA read from the PCMCIA device, and a non-DMA write to the PCMCIA device.

7. The system of claim 6, wherein the host adapter includes a latch which latches data from the PCMCIA such that a set of latched data is transferred in one clock cycle as a DMA write to the main memory.

8. The system of claim 7, wherein the central processing unit has access to the system bus while the host adapter is in the process of latching data.

9. The system of claim 6, wherein the host adapter includes a latch which stores data received by a DMA read from the main memory.

10. The system of claim 9, wherein the central processing unit has access to the system bus while the host adapter is transferring latched data to the PCMCIA device.

11. In a system having a microprocessor, a DMA controller, a host adapter, a system bus, a main memory, and non-DMA interface, a method for transferring data from a non-DMA device to the main memory, comprising the steps of:
   generating an interrupt from the device;
   setting up the DMA controller;
   setting up the host adapter;
   loading data from the non-DMA device to the host adapter according to a non direct memory access;
   writing the data from the host adapter to the main memory with a DMA write operation.

12. The method of claim 11 further comprising the step of setting a start bit after data has been loaded into the host adapter.

13. The method of claim 11 further comprising the step of setting the DREQ pin on the microprocessor after a pre-defined number of words have been loaded into the host adapter.

14. The method of claim 11 further comprising the step of waiting for a DMA acknowledgment signal before writing the data from the host adapter to the main memory.

15. The method of claim 11 further comprising the step of setting a done bit when data transfers are complete.

16. The method of claim 11 further comprising the step of taking the host adapter out of DMA mode after the DMA transfer has completed.

17. The method of claim 11, wherein the step of setting up the host adapter includes whether to increment an address of the device, a direction, and setting the host adapter in a DMA mode.

18. The method of claim 11, wherein the step of setting up the DMA controller includes setting a cycle steal mode and responding to an external DMA request.

19. The method of claim 11 further comprising the step of writing the starting address with the number of bytes to the device.

20. In a system having a microprocessor, a DMA controller, a host adapter, a system bus, a main memory, and non-DMA interface, a method for transferring data from the main memory to a non-DMA device, comprising the steps of:

setting up the host adapter;

setting up the DMA controller;

loading the data from the main memory into the host adapter with a DMA operation;

writing the data from the host adapter to the device in a non-DMA operation.

21. The method of claim 20 further comprising the step of determining whether the microprocessor has data to be transferred.

22. The method of claim 20 further comprising the step of setting up the device for a data write.

23. The method of claim 20 further comprising the step of setting a start bit in the host adapter when the DMA operation is complete.

24. The method of claim 20 further comprising the step of the host adapter setting a REQ pin on the microprocessor after the DMA operation is complete.

25. The method of claim 20 further comprising the step of waiting for an acknowledgment signal and latching a predefined number of data bytes.

26. The method of claim 20 further comprising the step of the microprocessor generating an internal DMA done interrupt.

27. The method of claim 20 further comprising the steps of the microprocessor waiting for a host adapter done bit to be set and then taking the host adapter out of DMA mode.

* * * * *